(12) United States Patent
Kandler et al.

(10) Patent No.: US 11,233,477 B2
(45) Date of Patent: Jan. 25, 2022

(54) METHOD AND SYSTEM FOR CONTROLLING AN ELECTRIC MOTOR AND DETECTING A STALL CONDITION

(71) Applicant: AB Mikroelektronik Gesellschaft mit beschraenkter Haftung, Salzurg (AT)

(72) Inventors: Markus Kandler, Koppl (AT); Peter Traintinger, Anthering (AT)

(73) Assignee: AB Mikroelektronik Gesellschaft mit beschraenkter Haftung, Salzurg (AT)

( * ) Notice: Subject to any disclaimer, the term of this patent is extended or adjusted under 35 U.S.C. 154(b) by 35 days.

(21) Appl. No.: 16/432,082

(22) Filed: Jun. 5, 2019

(65) Prior Publication Data
US 2019/0379317 A1  Dec. 12, 2019

Related U.S. Application Data (60) Provisional application No. 62/681,792, filed on Jun. 7, 2018.

(51) Int. Cl.
*H02P 29/024* (2016.01)
*B60H 1/00* (2006.01)
(Continued)

(52) U.S. Cl.
CPC ....... *H02P 29/026* (2013.01); *B60H 1/00428* (2013.01); *B60H 1/3205* (2013.01);
(Continued)

(58) Field of Classification Search
CPC .. H02P 29/026; H02P 6/28; H02P 6/34; H02P 6/21; B60H 1/00428; B60H 1/3205
See application file for complete search history.

(56) References Cited

U.S. PATENT DOCUMENTS 5,317,246 A  5/1994  Wei
7,042,180 B2  5/2006  Terry et al.
(Continued)

FOREIGN PATENT DOCUMENTS

EP  3 288 178     2/2018
GB     2101367 A  1/1983

OTHER PUBLICATIONS

PCT International Search Report and Written Opinion for corresponding PCT Application No. PCT/AT2019/060187, dated Sep. 6, 2019, 12 pages.
(Continued)

*Primary Examiner* — Kawing Chan
*Assistant Examiner* — Bradley R Brown
(74) *Attorney, Agent, or Firm* — Dority & Manning, PA (57) ABSTRACT

A method for detecting a stall condition of an electric motor. The method can include initiating an open-loop phase. During the open-loop phase, the method can include increasing a rotational speed of an electric motor and obtaining data indicative of a voltage associated with the electric motor while increasing the rotational speed of the electric motor. During the open-loop phase, the method can also include determining a difference between the voltage and a time varying target voltage and detecting a stall condition based at least in part on the difference between the voltage and the time varying target voltage. When a closed-loop condition is satisfied, the method can include initiating a closed-loop phase.

18 Claims, 6 Drawing Sheets

(51) Int. Cl.
*B60H 1/32* (2006.01)
*H02P 6/21* (2016.01)
*H02P 6/28* (2016.01)
*H02P 6/34* (2016.01)

(52) U.S. Cl.
CPC ............... *H02P 6/21* (2016.02); *H02P 6/28* (2016.02); *H02P 6/34* (2016.02)

(56) References Cited

U.S. PATENT DOCUMENTS

| | | |
|---|---|---|
| 2006/0181237 A1 | 8/2006 | Arefeen et al. |
| 2016/0156295 A1* | 6/2016 | Kaidu .................... H02P 6/182 318/400.11 |
| 2017/0126153 A1* | 5/2017 | Lepka ...................... H02P 6/18 |
| 2017/0163199 A1 | 6/2017 | Park et al. |
| 2017/0250628 A1 | 8/2017 | Tian |

OTHER PUBLICATIONS

Fu et al., "Reliable starting method for sensorless brushless dc motor drive," The 2012 IEEE/ASME International Conference on Advanced Intelligent Mechatronics, Jul. 11-14, 2012, Kaohsiung, Taiwan—pp. 1005-1010.

\* cited by examiner

METHOD AND SYSTEM FOR CONTROLLING AN ELECTRIC MOTOR AND DETECTING A STALL CONDITION

RELATED APPLICATIONS

This application claims priority to and the benefit of U.S. Provisional Patent Application No. 62/681,792 filed on Jun. 7, 2018. U.S. Provisional Patent Application No. 62/681,792 is hereby incorporated by reference in its entirety.

FIELD

Example aspects of the present disclosure relate generally to the field of electric motor control, for instance, for electric motors used in a pump system of an automobile cooling system.

BACKGROUND

Some types of electric motors are electrically commutated by rotating an electric field generated by at least one stator. The rotating electric field rotates a rotor. Field-oriented control refers to controlling a set of stator currents to rotate the electric field. Generally, the position of the rotor is sensed and used to align the electric field with the rotor. Sensing the position of the rotor, however, adds complexity and increases manufacturing cost associated with a positon sensor. Additionally, external magnetic fields can adversely affect the position sensor, leading to inaccurate position and speed indications, which can cause failure.

Sensor-less field-oriented control also suffers from drawbacks. For example, during an initial ramp up period, stalling can occur if the rotation of the rotor becomes unsynchronized with fluctuations in the stator currents.

SUMMARY

Aspects and advantages of embodiments of the present disclosure will be set forth in part in the following description, or may be learned from the description, or may be learned through practice of the embodiments.

One example aspect of the present disclosure is directed to a method for detecting a stall condition of an electric motor. The method can include initiating an open-loop phase. During the open-loop phase, the method can include increasing a rotational speed of an electric motor and obtaining data indicative of a voltage associated with the electric motor while increasing the rotational speed of the electric motor. During the open-loop phase, the method can also include determining a difference between the voltage and a time varying target voltage. During the open-loop phase, the method can include detecting a stall condition based at least in part on the difference between the voltage and the time varying target voltage. When a closed-loop condition is satisfied, the method can include initiating a closed-loop phase.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Repeat use of reference characters in the present specification and drawings is intended to represent same or analogous features or elements of the invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a method for detecting a stall condition of an electric motor. The electric motor can be used, for instance, in automotive applications, such as in a pump system of a vehicle cooling system. The electric motor can be configured as a permanent magnet synchronous motor (PMSM) and/or brushless direct current motor (BDCM/BLDC). However, the aspects of the present disclosure may find application with any suitable electric motor that employs electrical commutation.

The method can include an open-loop phase and a closed-loop phase. In some embodiments, the open-loop phases may generally align with a ramp up period during which a rotational speed of the electric motor is increased, e.g., from stopped to a ramp up target rotational speed. After successful ramp up, the method may switch to a closed-loop phase.

Aspects of the presently described method may provide various benefits as compared with purely closed-loop or purely open-loop methods. The open-loop phase, as described herein, may reduce the frequency of the electric motor stalling and/or increase the rate at which the electric motor may be ramped up when compared with implementing a closed-loop control method during ramp up. After the ramp up phase is complete, closed-loop control may provide improved control during normal operation when compared with open-loop control during normal operation.

The method can provide stall detection during the open-loop phase. A stall condition may correspond to a rotor being stopped, stuck, significantly slowed, or otherwise not operating as desired. Such a stall condition may be detected based, at least in part, on a difference between a voltage (e.g., a sensed voltage or a voltage derived from an internal model) and a time varying target voltage. For example, the voltage may include a voltage associated with a stator or a rotor of the electric motor. In some embodiments, the voltage may include a magnitude of a voltage component vector associated with at least one of a stator or a rotor of the electric motor. The voltage may be affected by back electromotive forces (EMF) associated with the rotation of the rotor of the electric motor. Thus, a stalled motor can be detected based on the voltage as described in greater detail herein.

When a closed-loop condition is satisfied, the closed-loop phase can be initiated. The closed-loop condition can be selected from a variety of conditions and may generally be indicative of a successful ramp up of the rotational speed of the electric motor. For example, in some embodiments, the closed-loop condition can be satisfied when the voltage exceeds a predetermined voltage threshold. This may indicate that the electric motor has reached the target rotational speed, or is within an acceptable tolerance thereof.

During the closed-loop phase, a feedback signal indicative of an applied current may be monitored. The applied current may be adjusted based at least in part on the feedback signal, e.g., to control the rotational speed of the electric motor based on a target rotational speed. For example, in some embodiments a proportional-integral (PI) or proportional-integral-derivative (PID) controller or control regime may be used.

One example aspect of the present disclosure is directed to a method for detecting a stall condition of an electric motor can include initiating an open-loop phase. During the open-loop phase, the method can include increasing a rotational speed of an electric motor and obtaining data indicative of a voltage associated with the electric motor while increasing the rotational speed of the electric motor. During the open-loop phase, the method can also include determining a difference between the voltage and a time varying target voltage. During the open-loop phase, the method can include detecting a stall condition based at least in part on the difference between the voltage and the time varying target voltage. When a closed-loop condition is satisfied, the method can include initiating a closed-loop phase.

In some embodiments, obtaining data indicative of the voltage can include deriving the voltage from an internal model.

In some embodiments, the method can include detecting the stall condition when the difference between the voltage and the time varying target voltage exceeds a delta threshold for at least a predetermined stall time threshold. In some embodiments, during the closed-loop phase, the method may include detecting the stall condition when the difference between the voltage and the time varying target voltage exceeds the delta threshold for at least the stall time threshold.

In some embodiments, the closed-loop condition is satisfied when the voltage exceeds a predetermined voltage threshold. In some embodiments, closed-loop condition is satisfied when the difference between the voltage and the time varying target voltage remains less than the delta threshold for at least a ramp up time threshold. In some embodiments, the method may include monitoring the rotational speed of the electric motor, and the closed-loop condition is satisfied when the rotational speed of the electric motor exceeds a speed threshold.

In some embodiments, the voltage can include a voltage associated with at least one of a rotor or a stator of the electric motor. In some embodiments, the voltage can include a vector component of a voltage associated with the at least one of a rotor or a stator of the electric motor.

In some embodiments, increasing the rotational speed of an electric motor can include applying a current of generally constant magnitude during the open-loop phase. In some embodiments, increasing the rotational speed of an electric motor can include applying a current having a predetermined time profile during the open-loop phase.

In some embodiments, during the closed-loop phase, the method can include monitoring a feedback signal indicative of an applied current and adjusting the applied current based at least in part on the feedback signal.

Another example embodiment of the present disclosure is directed to a motor control system for controlling an electric motor. The motor control system can include a voltage sensor electrically coupled with the electric motor and configured to sense a voltage associated with electric motor. The motor control system can include one or more control devices communicatively coupled to the voltage sensor and configured to control a current flow through the electric motor. The control device(s) can include including one or more processors and associated memory, and the memory can store instructions that, when executed by the processor(s) configure the control device(s) to perform operations. The operations can include initiating an open-loop phase. During the open-loop phase, the operations can include increasing a rotational speed of an electric motor and obtaining data indicative of a voltage from the voltage sensor while increasing the rotational speed of the electric motor. During the open-loop phase, the operations can include determining a difference between the voltage and a time varying target voltage and detecting a stall condition based at least in part on the difference between the voltage and the time varying target voltage. The operations can include initiating a closed-loop phase when a closed-loop condition is satisfied.

In some embodiments, the controller may be further configured to obtain data indicative of the voltage associated with the electric motor by deriving the voltage from an internal model.

In some embodiments, during the closed-loop phase, the operations can include monitoring a feedback signal indicative of the applied current and adjusting the applied current based at least in part on the feedback signal.

In some embodiments, the controller may be further configured to detect the stall condition when the difference between the voltage and the time varying target voltage exceeds a delta threshold for at least a predetermined stall time threshold. In some embodiments, during the closed-loop phase, the controller can be further configured to detect the stall condition when the difference between the voltage and the time varying target voltage exceeds the predetermined delta threshold for at least the predetermined stall time threshold.

In some embodiments, the closed-loop condition is satisfied when the voltage exceeds a predetermined voltage threshold. In some embodiments, the controller may be further configured to monitor the rotational speed of the electric motor, and the closed-loop condition is satisfied when the rotational speed of the electric motor exceeds a predetermined speed threshold. In some embodiments, the closed-loop condition is satisfied when the difference between the voltage and the time varying target voltage remains less than the predetermined delta threshold for at least a predetermined ramp up time threshold.

In some embodiments, the voltage can include a voltage associated with a stator of the electric motor. In some embodiments, the voltage can include a voltage component vector associated with the stator of the electric motor.

In some embodiments, the controller may be further configured to apply a current of generally constant magnitude during the open-loop phase to increase the rotational speed of the electric motor. In other embodiments, the controller may be further configured to apply a current having a predetermined time profile during the open-loop phase to increase the rotational speed of the electric motor.

Another example aspect of the present disclosure is directed to a pump system. The pump system can include a pump rotor configured to pump a liquid and an electric motor coupled with pump rotor to rotate the pump rotor. The pump system can include a voltage sensor electrically coupled with the electric motor and configured to sense a voltage associated with electric motor. The pump system can include one or more control devices communicatively coupled to the voltage sensor and configured to control a current flow through the electric motor. The control device(s) can include one or more processors and associated memory. The memory can store instructions that, when executed by the processor(s) configure the one or more control device to perform operations. The operations can include initiating an open-loop phase. During the open-loop phase, the operations can include increasing a rotational speed of an electric motor and obtaining data indicative of a voltage from the voltage sensor while increasing the rotational speed of the electric motor. The operations can include determining a difference between the voltage and a time varying target voltage. The operations can include detecting a stall condition based at least in part on the difference between the voltage and the time varying target voltage. The operations can include initiate a closed-loop phase when a closed-loop condition is satisfied. During the closed-loop phase, the operations can include monitoring a feedback signal indicative of the applied current and adjusting the applied current based at least in part on the feedback signal. In some embodiments, the pump system can be implemented in a vehicle cooling system.

Figure 1:
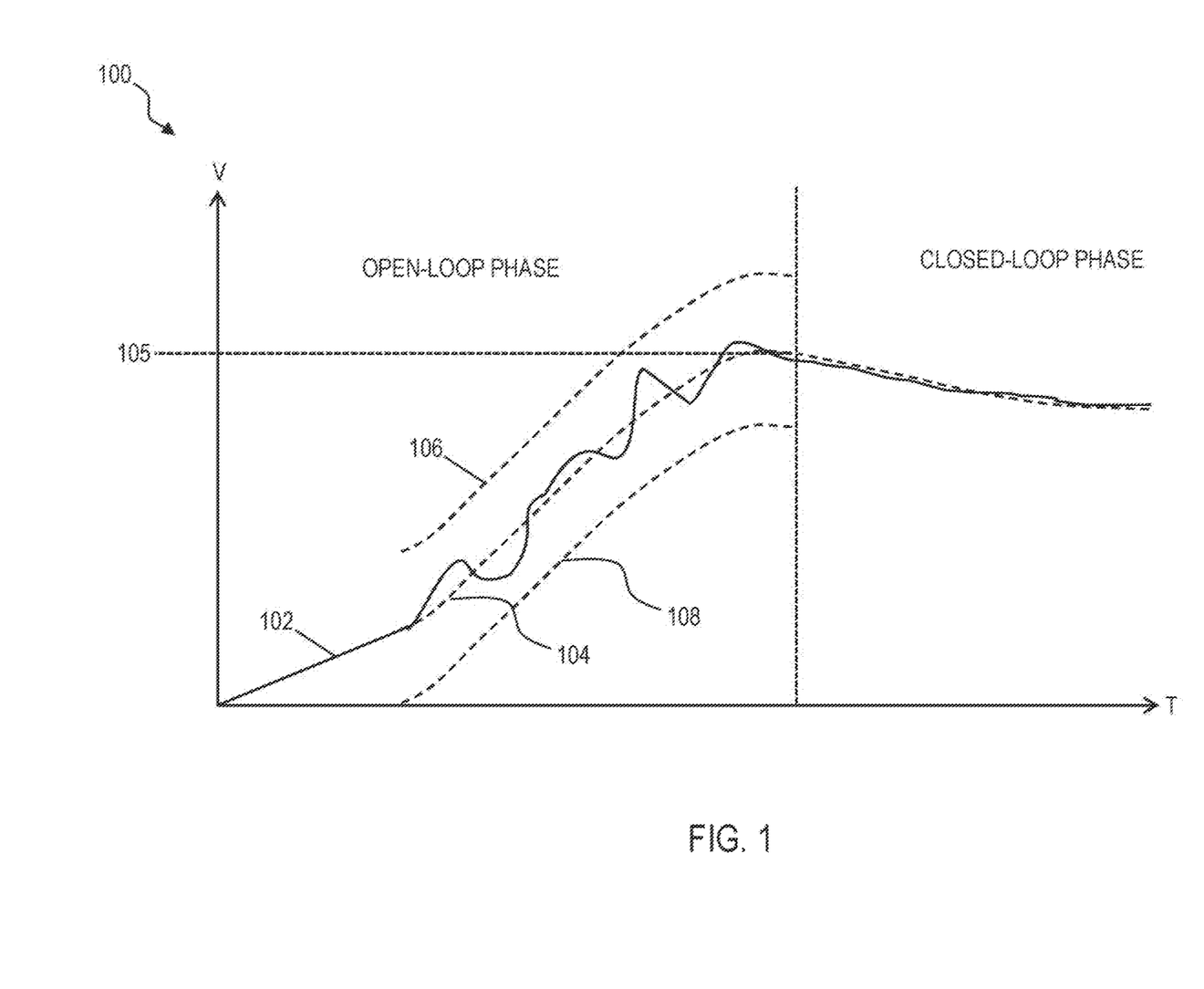
FIG. 1 depicts an example plot of a voltage associated with an electric motor during a ramp up period in which the rotational speed of the electric motor is increased according to example aspects of the present disclosure.

FIG. 1 depicts an example plot 100 of a voltage 102 associated with an electric motor during a ramp up period in which the rotational speed of the electric motor is increased. The voltage 102 may be sensed or may be derived from an internal model, for example as explained below. The voltage 102, V, is illustrated on the vertical axis, and time, T, is illustrated on the horizontal axis. During a ramp up period, the rotational speed of the electric motor may be increased. The voltage 102 may generally be indicative of the rotational speed of the electric motor such that an increase in the voltage 102 corresponds with an increase in the rotational speed. Thus, the time varying target voltage 104 may increase over time according to a desired ramp up rate and a ramp up target rotational speed 105 of the electric motor. The ramp up target rotational speed 105 may be defined as the desired rotational speed at which the open-loop phase ends and the closed-loop phase is initiated.

During an open-loop phase, the rotational speed of the electric motor may be increased in an open-loop manner. In some embodiments, a current may applied in a generally pre-determined manner, e.g., without regard for a voltage or sensed current associated with the operation of the electric motor. For example, a current of generally constant magnitude may be applied during the open-loop phase. The applied generally constant current may remain generally unaltered during the open-loop phase. In other embodiments, the applied current may have a predetermined time profile. For example, the applied current may be continuously increased at a predetermined rate over a predetermined time period and, optionally, held at a constant value thereafter. In some embodiments, the applied current may be increased and/or decreased in steps or stages. However, the applied current may have any suitable predetermined time profile.

When a closed-loop condition is satisfied, a closed-loop phase may be initiated. In some embodiments, the closed-loop condition may be associated with at least one of the voltage or a speed threshold, as explained in greater detail with reference to FIG. 3. Satisfaction of the closed-loop condition may generally be associated with successful completion of the ramp up period.

During the closed-loop phase, the operation of the electric motor may generally be controlled in a closed-loop manner. For example, a feedback signal indicative of the applied current may be monitored, and the applied current may be adjusted based at least in part on the feedback signal. The feedback signal may be indicative of the applied current.

Figure 2:
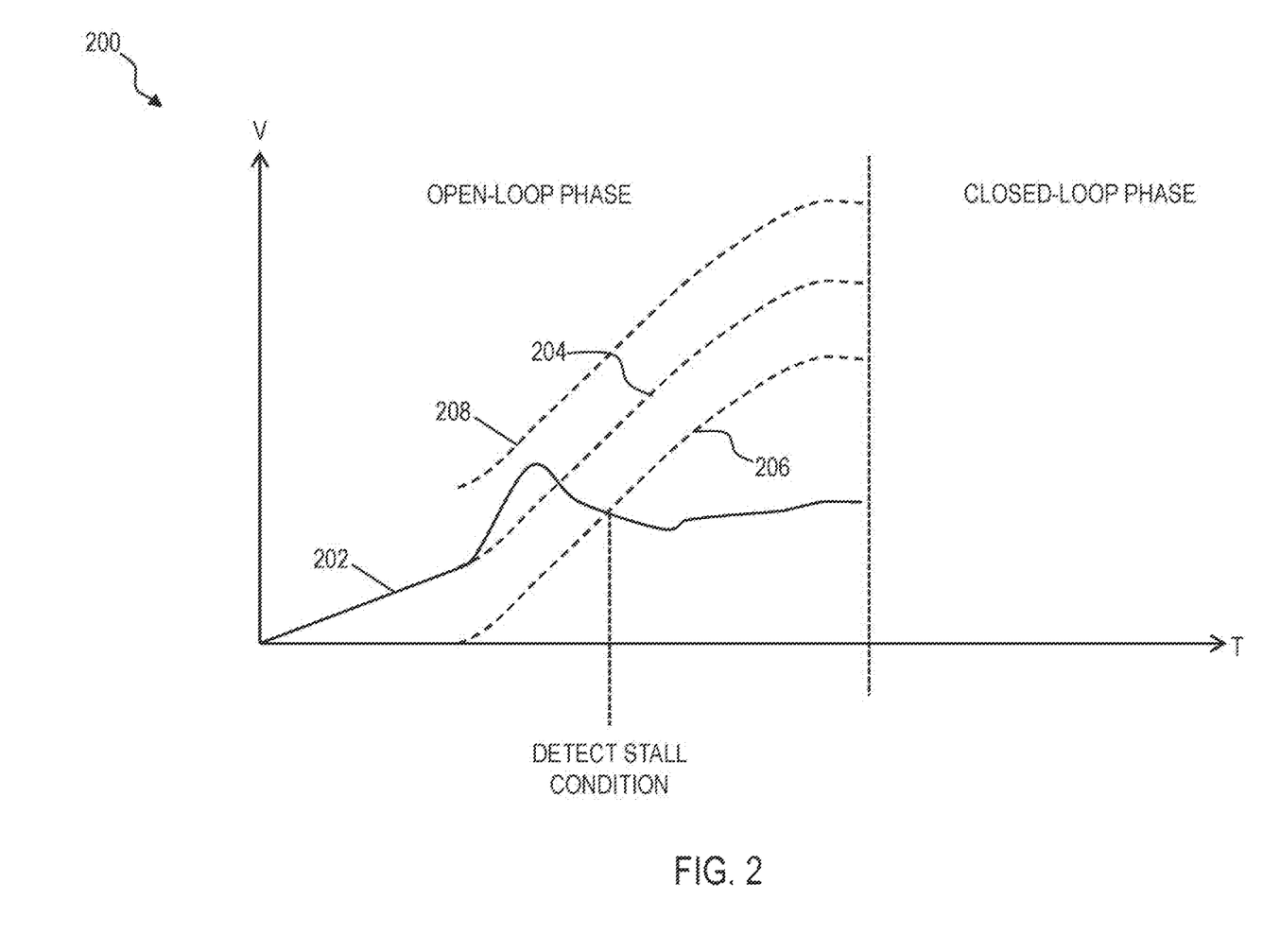
FIG. 2 depicts an example plot of a voltage associated with an electric motor during a ramp up period in which a stall condition is detected according to example aspects of the present disclosure.

FIG. 2 depicts a plot 200 of a voltage (e.g., a sensed voltage or a voltage derived from an internal model) associated with an electric motor during a ramp up period in which a stall condition is detected. For example, a stall condition may be detected when the voltage 202 fails to increase along with the time varying target voltage 104. Eventually, the difference between the voltage 202 and the time varying target voltage 204 exceeds a delta threshold, illustrated by the voltage 202 falling below a lower bound 206 associated with the time varying target voltage 204. The lower bound 206 may be defined as the time varying target voltage 204 minus the delta threshold. An upper bound 208 may similarly be defined as the time varying target voltage 204 plus the delta threshold.

This difference exceeding the delta threshold may be indicative of the rotor being stalled. For example, in some embodiments, the voltage 202 may be a voltage associated with at least one of the stator or the rotor of the electric motor. For example, the voltage 202 may be the voltage across a set of windings associated with the stator.

In some embodiments, the voltage may include a voltage component vector associated with the rotor of the electric motor. For example, $V_{sd}$ and $V_{sq}$ are direct and quadrature components, respectively, of a rotor voltage in the direct-quadrature reference frame. The direct-quadrature reference frame is based on the position of the rotor such that the direct direction generally aligns with the magnetic poles of the rotor, and the quadrature direction is perpendicular to the direct direction. The voltage may include the magnitude of the $V_{sq}$ voltage component, which is generally associated with the torque applied to the rotor. The magnitude of the $V_{sq}$ voltage component also generally correlates with the rotational speed of the rotor because of back EMF voltages, also referred to as counter-electromotive force (CEMF) voltages. Back EMF voltages result from the back EMF opposition to changes in the magnetic field. Increasing the rotational speed of the magnetic field, which is associated with increasing the speed of the rotor, results in an elevated back EMF voltage. As such, a decrease in one or more voltage component vectors, such as $V_{sq}$, may indicate that the rotor has slowed or stalled.

Figure 3:
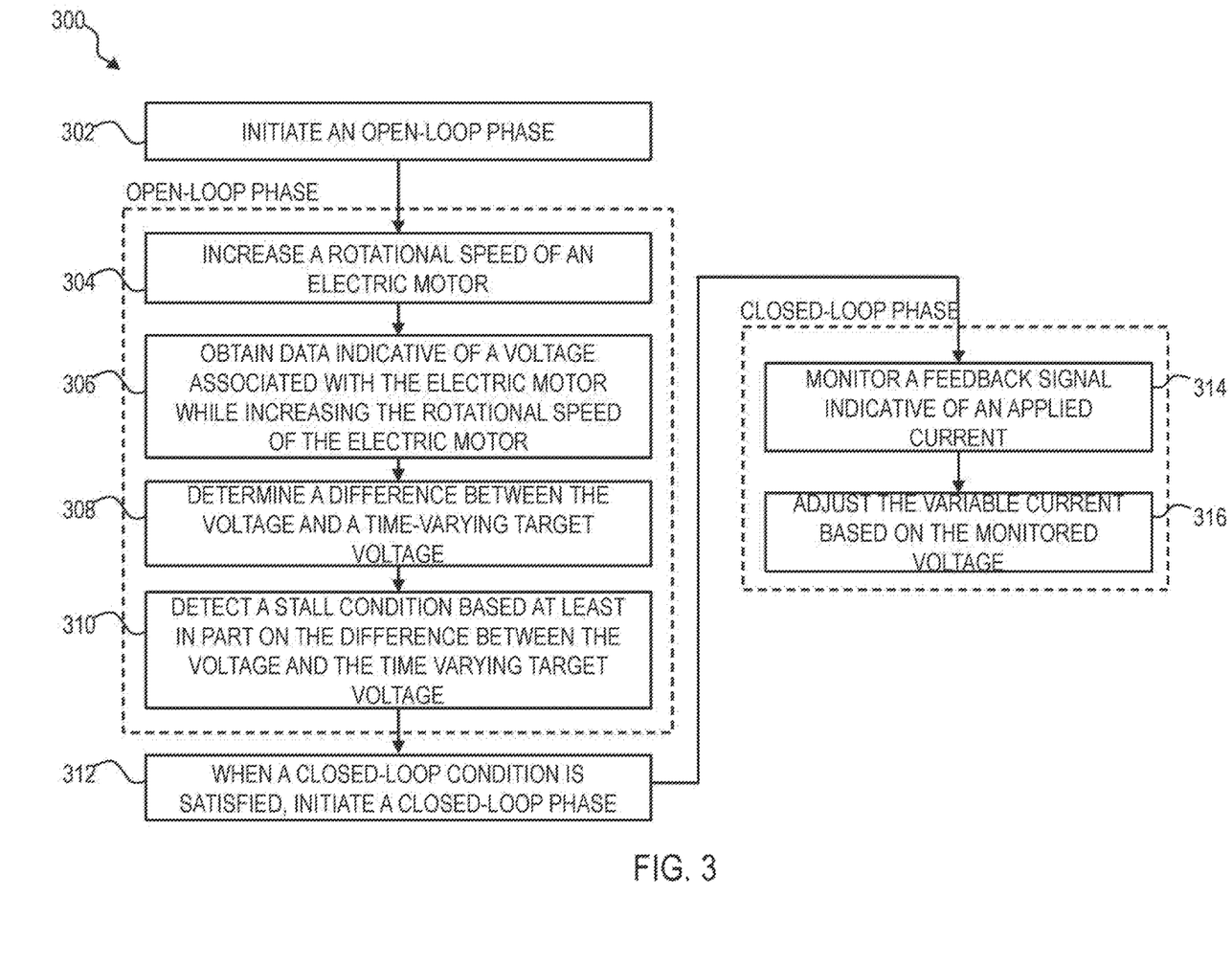
FIG. 3 depicts a flow diagram of an example method for detecting a stall condition of an electric motor according to example embodiments of the present disclosure.

FIG. 3 depicts a flow diagram of an example method (300) for detecting a stall condition of an electric motor according to example embodiments of the present disclosure. FIG. 3 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

At (302), the method (300) can include initiating an open-loop phase. During the open-loop phase, the operation of the electric motor may generally be controlled without adjustment based on a monitored parameter. For example, during the open-loop phase, at (304), the method (300) can include increasing a rotational speed of an electric motor. The electric motor may initially be stopped. Operation parameters of the electric motor may be adjusted such that the rotor of the electric motor begins to rotate. The operational parameters may be further adjusted such the rotational speed of the rotor is increased.

For example, a current may be applied through a set of windings associated with the stator. In some embodiments, the applied current may have a pre-determined time profile. For example, the applied current may generally have a constant magnitude during the open-loop phase. The amplitude of the applied current may be set at the start of the open-loop phase and remain constant during the open-loop phase. However, it should be understood that while the total applied current may remain constant, the current applied to various coils of the stator may vary as necessary to rotate the resulting magnetic field and thereby rotate the rotor.

At (306), the method (300) may include obtaining data indicative of a voltage associated with the electric motor while increasing the rotational speed of the electric motor. For example, one or more control devices may receive signals indicative of the voltage. In some embodiments, the voltage may include a voltage associated with a stator or a rotor of the electric motor. For example, the voltage may include a vector component of a voltage associated with the rotor of the electric motor, such as $V_{sq}$. In alternative embodiments, the vector component may be any other suitable vector component associated with the rotor or stator, such as $V_{sd}$.

In some embodiments, obtaining data indicative of the voltage associated with the electric motor may include deriving the voltage from an internal model (e.g., a model stored on and executed by the control system). For example, a parameter other than the voltage (e.g., a current associated with the electric motor) may be monitored, and the voltage may be derived therefrom using the internal model. For example, in some embodiments, the internal model may implement a look-up table or mathematical relationship that can be used to derive the voltage from the parameter.

At (308), the method (300) may include determining a difference between the voltage and a time varying target voltage. For example, an absolute value of the voltage minus the time varying target voltage may be calculated. The time varying target voltage may increase during the open-loop phase according to a predefined time profile. For example, the predetermined time profile of the time varying target voltage may be selected based on a number of factors, such as an expected ramp up rate of the rotor considering the applied current, the size of rotor, the expected load on the rotor, etc.

At (310), the method (300) may include detecting a stall condition based at least in part on the difference between the voltage and the time varying target voltage. For example, in some embodiments, the stall condition may be detected when the difference between the voltage and the time varying target voltage exceeds a delta threshold for at least a predetermined stall time threshold. The delta threshold and/or predetermined stall time threshold may be selected based on empirically collected data or calculated theoretically based on known parameters or characters of the electric motor and/or ramp up period. For example, the delta threshold may be selected based at least in part on the design and/or operational characteristics of the electric motor, including, for example, the voltage rating of the electric motor, the mass of the rotor, friction characteristics of rotational mounts supporting the rotor, a predicted load or resistance that the rotor may experience during the ramp up phase, etc. The predetermined stall time threshold and/or delta threshold may be selected based at least in part on characteristics of the ramp up period and/or electric motor, such as an overall time of the ramp up period, a target rotational speed and voltage associated therewith, expected variations in the rotational speed and/or voltage during the ramp up period, etc. For example, the predetermined stall time may be selected such that the difference between the voltage and the time varying target voltage must remain greater than a delta threshold for at least 10 data samples of the voltage, in some embodiments at least 5 data samples, in some embodiments at least 3 data samples, and in some embodiments at least 2 data samples. In other embodiments, the predetermined stall time threshold may be selected as a percentage of an overall time associated with the ramp up period. For example, in some embodiments the predetermined stall time threshold may be 25% or less of the overall time of the ramp up period, in some embodiments 10% or less, in some embodiments 5% of less, in some embodiments 2% or less, and in some embodiments 1% or less.

At (312), the method (300) may include initiating a closed-loop phase when a closed-loop condition is satisfied. Satisfaction of the closed-loop condition may generally be indicative of successful completion of the ramp up period.

In some embodiments, the closed-loop condition may be satisfied when the voltage exceeds a predetermined voltage threshold. This may indicate that the rotational speed of the electric motor has likely reached or exceeded the ramp up target rotational speed and that the ramp up period is complete. The predetermined voltage threshold may be selected based on an empirically determined or theoretically calculated relationship between the voltage and rotational speed of the electric motor. In some embodiments, the predetermined voltage threshold may be selected based at least in part on properties of the ramp up period, such as the ramp up target rotational speed and/or a total ramp up time associated with the ramp up period.

In other embodiments, the closed-loop condition may be satisfied when the difference between the voltage and the time varying target voltage remains less than the delta threshold for at least a ramp up time threshold. For example, this may also indicate that the rotor of the electric motor is rotating sufficiently fast such that a target rotational speed has likely been reached and that the ramp up period is complete. The ramp up time threshold may be selected based on empirically determined or theoretically calculated data. For example, it may be determined that the likelihood of a stall condition occurring is reduced below an acceptable threshold after a certain amount of time has passed without detecting the stall condition. In some embodiments, the ramp up time threshold may be selected based on a target rotational speed and/or total ramp up time associated with the ramp up period.

During the closed-loop phase, the operation of the electric motor may generally be controlled in a closed-loop manner.

During the closed-loop phase at (314), the method (300) may optionally include monitoring a feedback signal indicative of the applied current. The feedback signal may include one or more of a variety of suitable signals, such as sensed current applied to the electric motor (e.g., through windings of the stator(s)), a voltage that is indicative of the sensed current, and/or a magnitude or an angle of a vector component of one or more of the above sensed parameters. For example, in other embodiments, the feedback signal may include signals received from a current sensor that is configured to sense the current applied through windings of one or more stator(s). In other embodiments, the feedback signal may include signals received from a voltage sensor that is configured to sense a voltage across one or more stator(s) such that the applied current may be determined using the voltage.

At (316), the method (300) may optionally include, during the closed-loop phase, adjusting the applied current based at least in part on the feedback signal. A variety of suitable control methods may be implemented within the scope of this disclosure. Example closed-loop control methods include proportional-integral (PI) or proportional-integral-derivative (PID) control loops. Any other suitable closed-loop control method may be implemented within the scope of this disclosure, however.

In some embodiments, the method (300) may include, during the closed-loop phase, detecting a stall condition of the electric motor, in a similar manner as described above. Although a stall condition is generally less likely during the closed-loop phase, such a condition is possible nonetheless. In the closed-loop phase, the method (300) may include detecting an incipient stall condition before the electric motor has actually stalled and initiating a corrective action to prevent stalling. For example, a reduction in the voltage may prompt a reduction in a target rotational speed.

Figure 4:
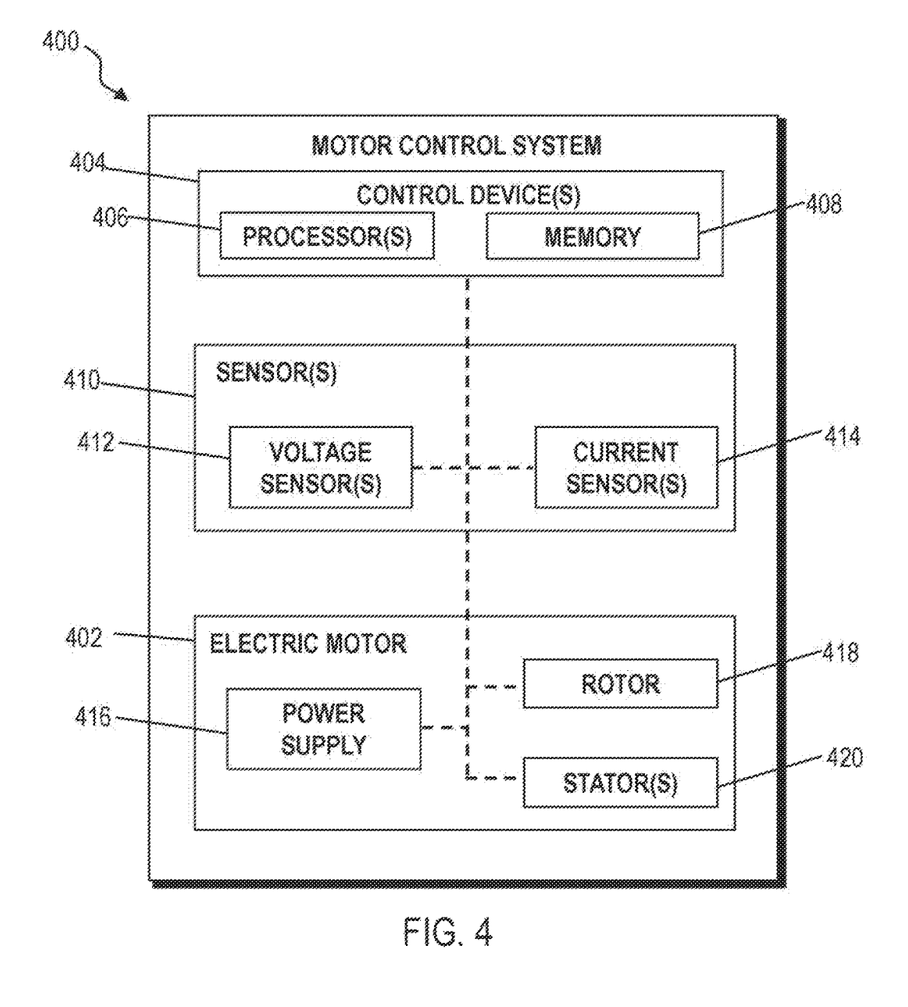
FIG. 4 depicts an example motor control system for controlling an electric motor according to example embodiments of the present disclosure.

FIG. 4 depicts a motor control system 400 for controlling an electric motor 402. The motor control system 400 may include one or more sensors 410 configured to sense operation parameters of the electric motor 402. For example, in some embodiments, the control system 400 may include one or more control devices 404. The control device(s) 404 can include one or more processors, microcontrollers, or other devices. For example, in some embodiments, the control device(s) 404 can include one or more processors 406 and one or more memory device 408. The processor(s) 404 can execute computer-readable instructions stored in the memory device(s) 408 to perform operations, such as control the operation of the electric motor 402 (e.g., during a ramp up period and during subsequent operation).

The motor control system 400 may include one or more sensor(s) 410, such as one or more voltage sensor(s) 412 and/or one or more current sensor(s) 414. The control device(s) 404 may be communicatively coupled to the sensor(s) 410 and configured to receive and interpret signals therefrom. The voltage sensor(s) 412 may be electrically coupled with the electric motor and configured to sense a voltage associated with electric motor 402. For example, the electric motor 402 may include a rotor 418 and a stator 420. The voltage sensor(s) 412 may be configured to measure the voltage across the rotor 418 and/or the stator 420 (e.g., across various windings of the stator 420). Although described herein with respect to a single stator 420 having multiple associated windings, it should be understood that, in some embodiments, multiple stators may be employed, each having one or more respective windings.

The control device(s) 404 may also be operatively connected with a power supply 416 that is operatively connected with the electric motor 402. The control device(s) 404 may be configured to control the operation of the electric motor 402 via the power supply 416. For example, the control device(s) 404 may be configured to control a current flow through the electric motor 404 (e.g., through windings of one or more stators 420) via the power supply 416 to control rotation of the rotor 418.

The control device(s) 404 may be configured to implement various embodiments of the method (300) described above with reference to FIG. 3 for detecting a stall condition of an electric motor. For example, in other embodiments, the control device(s) 404 may be configured to perform an implementation (500) of the method (300) described below with reference to FIG. 5.

Figure 5:
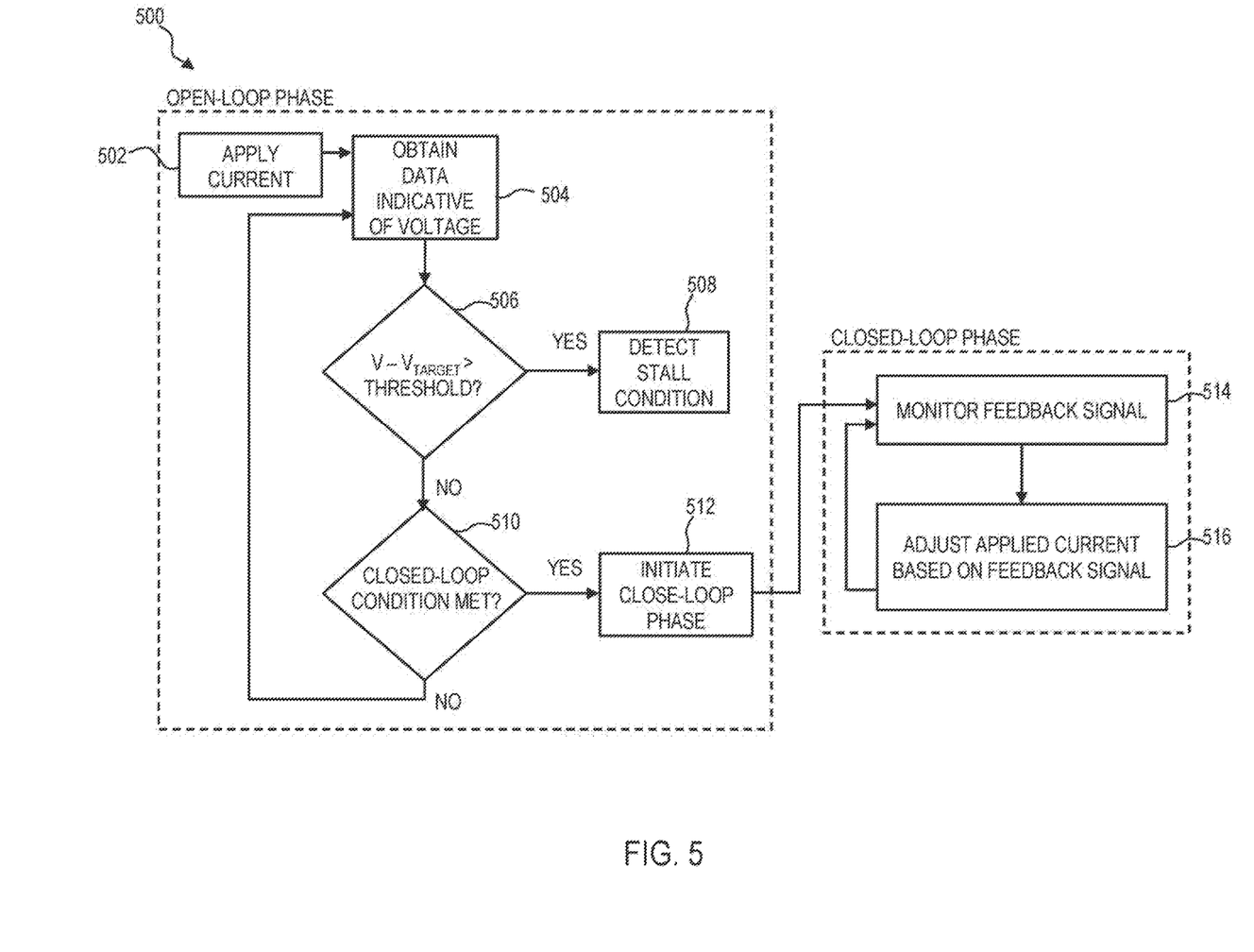
FIG. 5 depicts a flow diagram of an example implementation of the method depicted in FIG. 3 according to example embodiments of the present disclosure.

FIG. 5 depicts a flow diagram of an example implementation (500) of the method (300) described above with reference to FIG. 3. FIG. 5 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure.

The implementation (500) may include an open-loop phase and a closed-loop phase. At (502), the control device(s) 404 may be configured, during the open-loop phase, to increase a rotational speed of the electric motor 402 by applying a current to the electric motor (e.g., through a winding of one or more stator(s) 420 of the electric motor 404). In some embodiments, the applied current may have a predetermined time profile, such as a generally constant magnitude, during the open-loop phase.

At (504), the control device(s) 404 may be configured to obtain data indicative of a voltage associated with the electric motor 404 (e.g., a sensed voltage or a voltage derived from an internal model) while increasing the rotational speed of the electric motor 404. For example, the control device(s) 404 may receive signals from the voltage sensor(s) 412 that are indicative of a voltage associated with the applied current. For instance, in other embodiments, the voltage may comprise a vector component (e.g., $V_{sq}$) of a voltage across the rotor 418.

In some embodiments the control device(s) 404 may include an internal model, and the voltage may be derived from the internal model. For example, the control device(s) 404 may monitor a parameter other than the voltage (e.g., a current associated with the electric motor) and derive the voltage therefrom using the internal model. For example, in some embodiments, the internal model may implement a look-up table or mathematical relationship that can be used to derive the voltage from the parameter.

At (506), the control device(s) 404 may determine a difference between the voltage (represented by V in FIG. 5), and a time varying target voltage (represented by $V_{TARGET}$ in FIG. 5) and compare the difference with a delta threshold. If the difference is greater than the delta threshold, at (508), the control device(s) 404 may detect a stall condition, such as the rotor 418 being stopped or blocked. In some embodiments, the control device(s) 404 may only detect the stall condition if the difference exceeds the delta threshold for at least a predetermined stall time threshold. As discussed above, with reference to FIG. 3, the delta threshold and/or predetermined stall time threshold may be selected based on empirically collected data or calculated theoretically based on known parameters or characters of the electric motor and/or ramp up period.

Additionally, in some embodiments, if a stall condition is detected, at (508), a subsequent attempt may automatically be made to increase the rotational speed of the electric motor to a target rotational speed. For example, the implementation (500) may be restarted, at (502). One or more parameters of the implementation (500) may be varied to increase the likelihood of successfully increasing the electric motor to the target rotational speed. Examples include decreasing a total time or ramp up rate associated with the ramp up period. For instance, a stall condition may indicate that the electric motor is experiencing significant resistance during the open-loop phase. Thus, a slower ramp up rate corresponding with a more gradual increase of the time varying target voltage may provide longer for the electric motor to overcome such resistance. This may reduce the likelihood of a stall condition occurring during ramp up. Additional actions may be taken in response to detecting a stall condition, such as providing a notification or alert to a user (e.g., a check engine light in a vehicle).

If a stall condition is not detected at (506) and (508), the implementation 500 may include, at (510), determining whether a closed-loop condition is satisfied. As discussed above, with reference to FIG. 3, in some embodiments, the closed-loop condition may be satisfied when the voltage exceeds a predetermined voltage threshold. In other embodiments, the closed-loop condition may be satisfied when the difference between the voltage and the time varying target voltage remains less than the delta threshold for at least a ramp up time threshold.

If the closed-loop condition is not satisfied, the method (500) may return, at (504), to obtaining data indicative of a voltage associated with the electric motor 404 while increasing the rotational speed of the electric motor 404.

If the closed-loop condition is satisfied, the method (500) may include, at (512) initiating the closed-loop phase. In the closed-loop phase, the method (500) may include, at (514), monitoring a feedback signal indicative of current applied to the electric motor 402 (e.g., through windings of the stator(s) 420). As discussed above with reference to FIG. 3, the feedback signal may include a variety of suitable signals, such as a sensed current applied to the electric motor 402 (e.g., sensed by the current sensor(s) 414), a voltage that is indicative of the sensed current (e.g., sensed by the voltage sensor(s) 412), and/or a magnitude or an angle of a vector component of one or more of the above sensed parameters.

At (516), the method may include adjusting the applied current based on the feedback signal. For example, in some embodiments, a PI or PID control loop may be used to control the applied current and thereby control the rotational speed of the electric motor 402.

Figure 6:
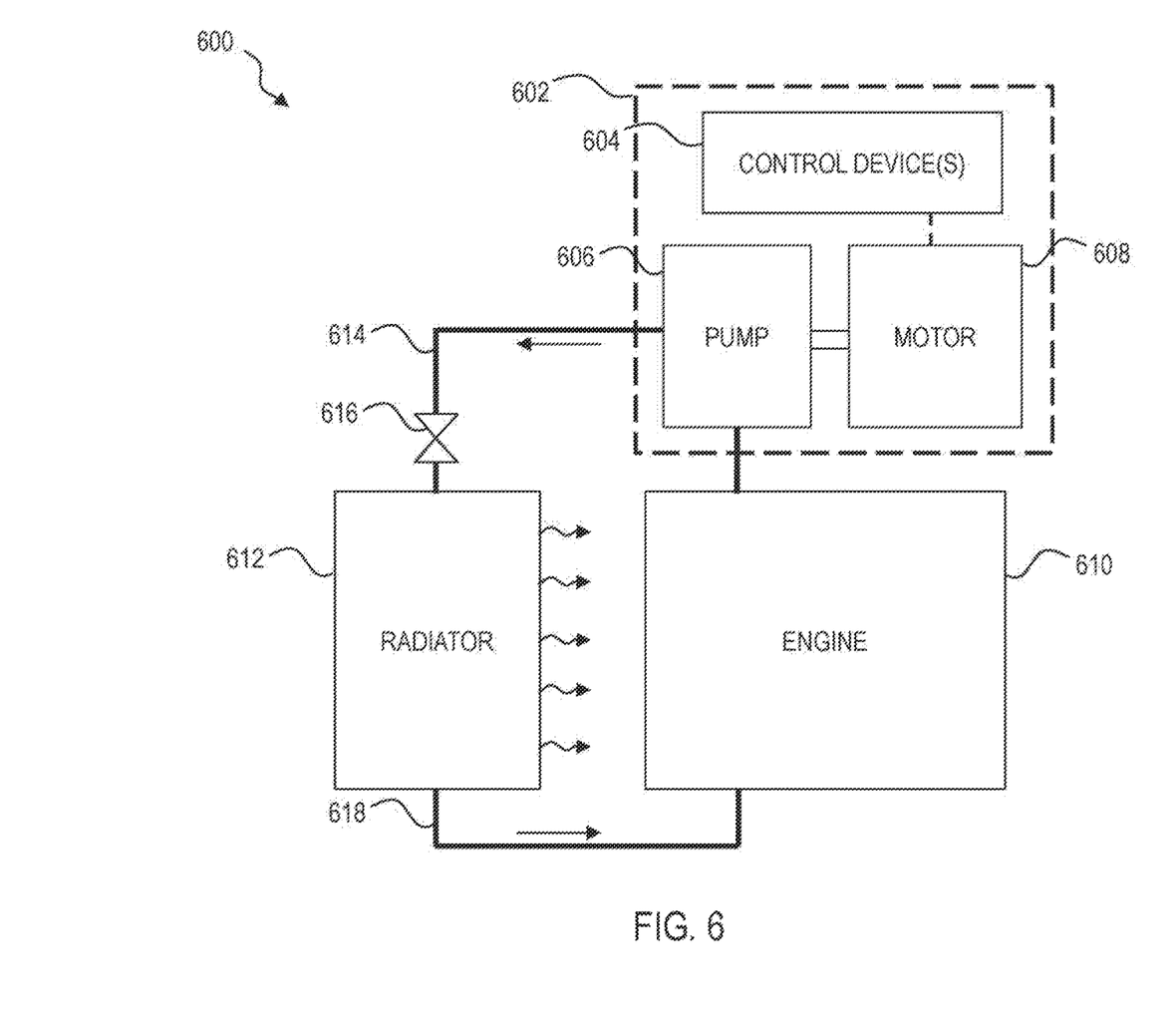
FIG. 6 depicts a block diagram of a vehicle cooling system incorporating the motor control system according to example embodiments of the present disclosure.

FIG. 6 depicts a block diagram of a vehicle cooling system incorporating the motor control system according to example embodiments of the present disclosure. More specifically, in some embodiments, the motor control system 400 can be implemented in a pump control system of a cooling system for a vehicle. For example, a vehicle cooling system 600 may include a pump system 602 that is configured to regulate the flow of a coolant liquid through the vehicle cooling system 600. The pump system 602 may generally be configured similarly to the motor control system 400 with the addition of a pump. For example, the pump system 602 may include one or more control devices 604, a pump 606, and an electric motor 608. The pump 606 may include a pump rotor that is configured to pump a liquid, such as a coolant. The electric motor 608 may be coupled with pump rotor of the pump 606 (e.g., via a drive shaft) to rotate the pump rotor and pump the liquid. A voltage sensor may be electrically coupled with the electric motor and configured to sense a voltage associated with electric motor 608, for example as described above with reference to FIG. 4.

The control device(s) 604 may be communicatively coupled with a voltage sensor, for example as discussed with reference to FIG. 4. The control device(s) 604 may be configured to control a current flow through the electric motor 608. The control device(s) 604 may include one or more processors and associated memory, for example as described above with reference to FIG. 4. The memory may store instructions that, when executed by the one or more processors configure the control device(s) 604 to perform operations in accordance with aspects of the present disclosure. For example, the control device(s) 604 may be configured to perform various embodiments of the method (300) described above with reference to FIG. 3, such as the implementation (500) described above with reference to FIG. 5.

Referring to FIG. 6, the vehicle cooling system 600 may include a heat source 610, such as an engine or fuel cell stack, and a radiator 612. A series of fluid lines may connect the pump 606 with the heat source 610 and the radiator 612. For example, heated coolant fluid may be drawn from the heat source 610 into the pump 606 and pumped out through a send line 614. The heated coolant liquid may flow through an expansion valve 616 and be converted into a gas phase before entering the radiator 612. The radiator 612 may dissipate heat from the coolant before the coolant condenses and flows through a return line 618 and back to the heat source 610. In some embodiments, the control device(s) 604 may be configured to generate an alert, such as illuminating a check engine light, upon detection of a stall condition. It should be understood that the above discussion of a vehicle cooling system is merely an example. Aspects of the present disclosure may find application in vehicle cooling systems having other configurations or in cooling systems for other systems. Moreover, the aspects of the present disclosure may find application in any device employing an electric motor that is electrically commutated, such as a PMSM or a BDCM.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:
1. A method for detecting a stall condition of an electric motor during a start-up period, the method comprising:
   initiating an open-loop phase, wherein during the open-loop phase, the method comprises:
      applying a current configured to increase a rotational speed of an electric motor;
      obtaining data indicative of a voltage associated with the electric motor from a voltage sensor while increasing the rotational speed of the electric motor;

determining a difference between the voltage and a time varying target voltage, wherein the time varying target voltage is predetermined; and detecting a stall condition based at least in part on the difference between the voltage and the time varying target voltage;

when a closed-loop condition is satisfied, initiating a closed-loop phase, wherein the closed-loop condition is satisfied when the difference between the voltage and the time varying target voltage remains less than a delta threshold for at least a ramp up time threshold, the ramp up time threshold indicative of a period of time during which the rotational speed of the electric motor increases.

2. The method of claim 1, wherein detecting the stall condition based at least in part on the difference between the voltage and the time varying target voltage comprises detecting the stall condition when the difference between the voltage and the time varying target voltage exceeds a delta threshold for at least a predetermined stall time threshold.

3. The method of claim 1, further comprising monitoring the rotational speed of the electric motor, and wherein the closed-loop condition is satisfied when the rotational speed of the electric motor exceeds a speed threshold.

4. The method of claim 1, wherein the voltage comprises a voltage associated with at least one of a stator or a rotor of the electric motor.

5. The method of claim 1, wherein the voltage comprises a vector component of a voltage associated with at least one of a stator or a rotor of the electric motor.

6. The method of claim 1, wherein during the closed-loop phase, the method further comprises detecting the stall condition when the difference between the voltage and the time varying target voltage exceeds the delta threshold for at least the predetermined stall time threshold.

7. The method of claim 1, wherein increasing the rotational speed of the electric motor comprises applying a current of generally constant magnitude during the open-loop phase.

8. The method of claim 1, wherein increasing the rotational speed of the electric motor comprises applying a current having a predetermined time profile during the open-loop phase.

9. The method of claim 1, wherein during the closed-loop phase, the method comprises monitoring a feedback signal indicative of an applied current and adjusting the applied current based at least in part on the feedback signal.

10. The method of claim 1, wherein obtaining data indicative of the voltage comprises deriving the voltage from an internal model.

11. A motor control system for controlling an electric motor, the system comprising:

a voltage sensor electrically coupled with the electric motor and configured to sense a voltage associated with the electric motor;

one or more control devices communicatively coupled to the voltage sensor and configured to control a current flow through the electric motor, the one or more control devices including one or more processors and associated memory, the memory storing instructions that, when executed by the one or more processors configure the one or more control device to:

initiate an open-loop phase, wherein during the open-loop phase, the one or more control devices are configured to:

configured to apply a current configured to increase a rotational speed of an electric motor;

configured to obtain data indicative of a voltage from the voltage sensor while increasing the rotational speed of the electric motor;

configured to determine a difference between the voltage and a time varying target voltage, wherein the time varying target voltage is predetermined;

configured to detect a stall condition based at least in part on the difference between the voltage and the time varying target voltage; and when a closed-loop condition is satisfied, initiate a closed-loop phase, wherein the closed-loop condition is satisfied when the difference between the voltage and the time varying target voltage remains less than a delta threshold for at least a ramp up time threshold, the ramp up time threshold indicative of a period of time during which the rotational speed of the electric motor increases.

12. The system of claim 11, wherein the voltage comprises a voltage associated with at least one of rotor or a stator of the electric motor.

13. The system of claim 11, wherein the voltage comprises a voltage component vector associated with at least one of a rotor or a stator of the electric motor.

14. The system of claim 11, wherein the controller is further configured to apply a current of generally constant magnitude during the open-loop phase to increase the rotational speed of the electric motor.

15. The system of claim 11, wherein the controller is further configured to apply a current having a predetermined time profile during the open-loop phase to increase the rotational speed of the electric motor.

16. The system of claim 11, wherein the controller is further configured to obtain data indicative of the voltage associated with the electric motor by deriving the voltage from an internal model.

17. A pump system comprising:

a pump rotor configured to pump a liquid;

an electric motor coupled with the pump rotor to rotate the pump rotor;

a voltage sensor electrically coupled with the electric motor and configured to sense a voltage associated with the electric motor;

one or more control devices communicatively coupled to the voltage sensor and configured to control a current flow through the electric motor, the one or more control devices including one or more processors and associated memory, the memory storing instructions that, when executed by the one or more processors configure the one or more control device to:

initiate an open-loop phase, wherein during the open-loop phase, the one or more control devices are configured to:

configured to increase a rotational speed of an electric motor;

configured to obtain data indicative of a voltage from the voltage sensor while increasing the rotational speed of the electric motor;

configured to determine a difference between the voltage and a time varying target voltage, wherein the time varying target voltage is predetermined;

configured to detect a stall condition based at least in part on the difference between the voltage and the time varying target voltage; and when a closed-loop condition is satisfied, initiate a closed-loop phase, wherein the closed-loop condition is satisfied when the difference between the voltage and the time varying target voltage remains less than a delta threshold for at least a ramp up time threshold, the ramp up time threshold indicative of a period of time during which the rotational speed of the electric motor increases; and wherein during the closed-loop phase, the one or more control devices are configured to:
  monitor a feedback signal indicative of a current applied to the electric motor coupled to the pump rotor; and
  adjust the current applied to the electric motor coupled to the pump rotor based at least in part on the feedback signal.

18. The pump system of claim 17, wherein the pump system is implemented in a vehicle cooling system.

* * * * *